United States Patent Office 3,168,521
Patented Feb. 2, 1965

3,168,521
3-ALKYLATED-2-AMINO-5,6-POLYMETHYLENE-4(3H)-PYRIMIDINONES
Hans A. Wagner, Skokie, Ill., assignor to G. D. Searle & Co., Chicago, Ill., a corporation of Delaware
No Drawing. Filed June 3, 1963, Ser. No. 284,829
7 Claims. (Cl. 260—256.4)

This invention relates to 3-alkylated-2-amino-5,6-polymethylene-4(3H)-pyrimidinones and a process for the manufacture thereof. More particularly, this invention provides new and inherently useful chemical compounds of the formula

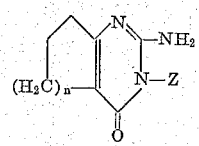

wherein Z represents a hydroxyalkyl or alkynyl radical and n represents a positive integer less than 3.

Among the hydroxyalkyl and alkynyl radicals represented by Z, those containing more than 1 and fewer than 4 carbon atoms are preferred, i.e., hydroxyethyl, hydroxypropyl, ethynyl, and propynyl groupings. Less optimally adapted to present purposes but also comprehended by Z are other hydroxyalkyl and alkynyl radicals which may be thought of as deriving, respectively, by substitution of 1 or more hydroxyls for hydrogen in a lower alkyl radical and by elimination of appropriate hydrogen from a lower alkyl radical (excluding the methyl grouping, of course) in favor of a triple bond. Those skilled in the art will recognize that lower alkyl radicals are methyl, ethyl, propyl, isopropyl, butyl, isobutyl, sec-butyl, tert-butyl, pentyl, neopentyl, hexyl, isohexyl, heptyl, and like monovalent saturated, acyclic, straight- or branched-chain, hydrocarbon groupings of emperical formula $$-C_nH_{2n+1}$$

wherein n represents a positive integer less than 9.

It will be further recognized by those skilled in the art that 2-aminopyrimidine derivatives of the type with which we are here concerned can and do reversibly tautomerize to corresponding imines, thus

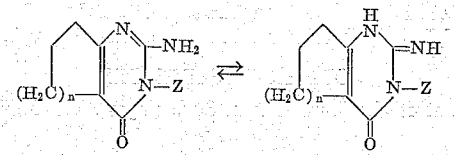

the proportion of the two tautomers present in any given circumstance being dependent upon the physical state of the substance involved, and its environment: whether it be solid or liquid and, if dissolved, in what solvent and at what pH. Accordingly, the naming and enformulation of the subject compounds as 2-amines and not 2-imines is a matter of convenience only; *both* tautomeric forms are within the ambit of the described invention.

Equivalent to the foregoing amine bases of this invention for the purposes here described are corresponding non-toxic acid addition salts of the formula

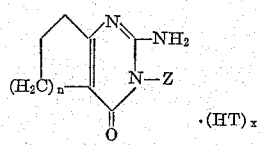

wherein Z and n retain the meanings previously assigned; T represents 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage; and x represents a positive integer less than 4, its precise value depending upon the number of basic nitrogen atoms involved in salt formation.

The compounds to which this invention relates are useful as chemical intermediates and by reason of their valuable pharmacological properties. Thus, for example, they are anti-ulcerogenic, pepsin-inhibitory, and anti-hypercholesterolemic.

Manufacture of the claimed compounds proceeds by heating an appropriate 2 - amino - 5,6 - polymethylene-pyrimidin-4-ol with a selected alkyl halide $$Z-Br$$

in a solution of sodium methoxide in methanol. (The meanings of n and Z remain as before.)

Conversion of the basic amines of this invention to corresponding acid addition salts is accomplished by mixing the base with from 1 to 3 equivalents, as indicated, of any of various inorganic and strong organic acids, the anionic portion of which conforms to T as hereinabove defined.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centrigrade and relative amounts of materials in parts by weight, except as otherwise noted.

*Example 1*

*2-amino-6,7-dihydro-3-(2 - hydroxyethyl) - 5H - cyclopenta[d]pyrimidin-4(3H)-one.*—To a solution of 7 parts of sodium methoxide in 350 parts of methanol is added 15 parts of 2-amino-6,7-dihydro-5H-cyclopenta[d]pyrimidin-4-ol, followed by 16 parts of 2-bromoethanol. The resultant mixture is maintained with agitation at room temperature for 1 hour, then heated at the boiling point under reflux with continued agitation overnight. Solvent is thereupon removed by vacuum distillation and the residue suspended in a solution of 10 parts of sodium hydroxide in 1000 parts of water. After 2 hours, insoluble solids are filtered off, washed on the filter with water until the washings are neutral to litmus, dried in air, and recrystallized from methanol. The recrystallized material, washed with ether, is 2-amino-6,7-dihydro-3-(2-hydroxyethyl)-5H-cyclopenta[d]pyrimidin-4(3H)-one melting at approximately 249°. The product has the formula

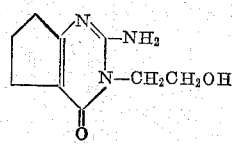

*Example 2*

*2-amino-6,7-dihydroxy - 3 - (2 - hydroxypropyl) - 5H-cyclopenta[d]pyrimidin-4(3H)-one.*—Substitution of 18 parts of 1-bromo-2-propanol for the 2-bromoethanol called for in Example 1 affords, by the procdure there detailed, 2-amino-6,7-dihydroxy-3-(2-hydroxypropyl-5H-cyclopenta[d]pyrimidin-4(3H)-one, having the formula

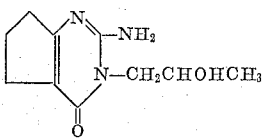

Example 3

*2-amino - 5,6,7,8 - tetrahydro - 3 - (2 - hydroxyethyl)-4(3H)-quinazolinone.*—Substitution of 16 parts of 2-amino-5,6,7,8-tetrahydro-4-quinazolinol for the 2-amino-6,7-dihydro-5H-cyclopenta[d]pyrimidin-4-ol called for in Example 1 affords, by the procedure there detailed, 2-amino-5,6,7,8-tetrahydro-3 - (2 - hydroxyethyl) - 4(3H)-quinazolinone melting at approximately 240°. The product has the formula

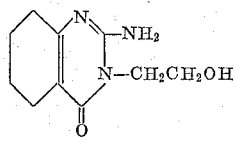

Example 4

*2-amino-6,7-dihydro-3 - propynyl - 5H - cyclopenta[d] pyrimidin-4(3H)-one.*—Substitution of 16 parts of 3-bromo-1-propyne for the 2-bromoethanol called for in Example 1 affords, by the procedure there detailed, 2-amino - 6,7 - dihydro - 3 - propynyl - 5H - cyclopenta[d] pyrimidin-4(3H)-one melting at 238–240°. The product has the formula

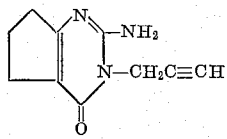

Example 5

*2-amino-5,6,7,8-tetrahydro-3-propynyl - 4(3H) - quinazolinone.*—Substitution of 16 parts of 2-amino-5,6,7,8-tetrahydro-4-quinazolinol and 16 parts of 3-bromo-1-propyne for the 2-amino-6,7-dihydro-5H-cyclopenta[d]pyrimidin-4-ol and 2-bromoethanol, respectively, called for in Example 1 affords, by the procedure there detailed, 2-amino-5,6,7,8-tetrahydro-3-propynyl - 4(3H) - quinazolinone melting at 216–218°. The product has the formula

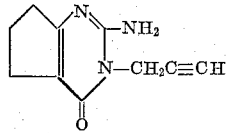

What is claimed is:
1. A compound of the formula

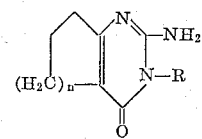

wherein R represents a member of the group consisting of radicals of the formulas

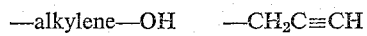

in which the alkylene radical called for contains more than 1 and fewer than 4 carbon atoms and $n$ represents a positive integer less than 3.

2. A compound of the formula

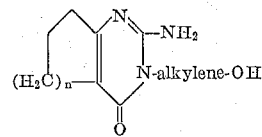

wherein the alkylene radical called for contains more than 1 and fewer than 4 carbon atoms and $n$ represents a positive integer less than 3.

3. 2-amino-6,7-dihydro-3-(2-hydroxyethyl)-5H - cyclopenta[d]pyrimidin-4(3H)-one.

4. 2-amino-5,6,7,8-tetrahydro - 3 - (2 - hydroxyethyl)-4(3H)-quinazolinone.

5. A compound of the formula

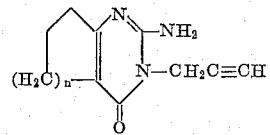

wherein $n$ represents a positive integer less than 3.

6. 2-amino-6,7-dihydro-3-propynyl-5H - cyclopenta[d] pyrimidin-4(3H)-one.

7. 2-amino-5,6,7,8-tetrahydro-3-propynyl-4(3H) - quinazolinone.

References Cited in the file of this patent
UNITED STATES PATENTS

| | | |
|---|---|---|
| 2,517,824 | Appelquest | Aug. 8, 1950 |
| 2,621,162 | Baker | Dec. 9, 1952 |
| 2,969,361 | Thompson | Jan. 24, 1961 |
| 3,007,938 | Kirchner | Nov. 7, 1961 |

OTHER REFERENCES

Grout et al.: Jour. Chem. Soc., pages 3540–5 (1960).